(12) United States Patent
Wallis et al.

(10) Patent No.: US 6,244,528 B1
(45) Date of Patent: Jun. 12, 2001

(54) METHOD AND APPARATUS FOR PRODUCING FINE POWDER FROM A LEGUME OR GRAIN

(76) Inventors: Loren Paul Wallis, 1636 W. Mountain, Glendale, CA (US) 91201; Josef Otto Rettenmaier, Holzmühle 1, 73494 Rosenberg (DE)

( * ) Notice: Subject to any disclaimer, the term of this patent is extended or adjusted under 35 U.S.C. 154(b) by 0 days.

(21) Appl. No.: 09/352,965

(22) Filed: Jul. 14, 1999

(51) Int. Cl.[7] .................................................. B02C 9/00
(52) U.S. Cl. ...................................... 241/8; 241/23
(58) Field of Search ................................. 426/443, 634; 241/65, 6–9, 23

(56) References Cited

U.S. PATENT DOCUMENTS

| 3,782,968 | 1/1974 | Herzberg et al. . |
|---|---|---|
| 3,965,267 | 6/1976 | Davis . |
| 4,076,851 | 2/1978 | Tunoda . |
| 4,463,022 | * 7/1984 | Sterner et al. .................. 241/65 |
| 5,115,984 | 5/1992 | Satake . |
| 5,185,175 | 2/1993 | Loh et al. . |
| 5,364,471 | 11/1994 | Czuchajowska . |

* cited by examiner

Primary Examiner—Mark Rosenbaum
(74) Attorney, Agent, or Firm—Oppenheimer Wolff & Donnelly LLP

(57) ABSTRACT

A method and apparatus for producing a fine powder from a grain or legume, such as soy beans, wherein the soy beans or the like are ground under controlled temperature and humidity conditions in a mill to a particle size of between about 5 to 25 microns, preferably about 15 microns.

15 Claims, 1 Drawing Sheet

METHOD AND APPARATUS FOR PRODUCING FINE POWDER FROM A LEGUME OR GRAIN

BACKGROUND OF THE INVENTION

1. Field of the Invention

The invention relates to a method and apparatus for producing fine powder from a grain or legume; particularly, producing a fine soybean powder used as an additive in milk, making of tofu or as an additive in other foods.

2. Related Art

Today's emphasis on good eating habits and particularly cutting down on meat and the like has encouraged people to turn to more fruits, grains, legumes, and vegetables in their diet. One particular legume that has become of more interest in recent years is soy beans. Soy beans have been used to make milk products, tofu and other products. Soy beans are high in nutritional value. However, although a number of processes are known for producing a fine soybean powder with the odor emitted and soybean fat removed, heretofore such processes have been expensive, did not totally deodorize the soy beans or did not remove a sufficiently high percentage of fat or undesirable enzymes. There is a need for a process for grinding soy beans and other legumes or grains, such as rice, corn, pinto beans, etc. to a fine powder without removing the functional and nutritional constituents of the soybeans while having the option to reduce or inactivate the enzymes as needed for the particular application. This is applicable to any other suitable grain or legume.

SUMMARY OF THE INVENTION

It is an object of this invention to grind legumes or grains to a fine powder removing undesired qualities of such legumes or grains while retaining the desired constituents of such legumes or grains.

It is a further object of this invention to carry out the foregoing object in the grinding of soy beans.

These and other objects are preferably accomplished by grinding raw grains or legumes, such as soy beans, under controlled temperature and humidity conditions in a mill to a particle size of between 5 to 25 microns, preferably about 15 microns.

BRIEF DESCRIPTION OF THE DRAWINGS

The sole FIGURE of the drawing is a schematic view of apparatus for producing fine powder, such as soybean powder, in accordance with the present invention.

DETAILED DESCRIPTION OF THE PREFERRED EMBODIMENT

Figure 1:
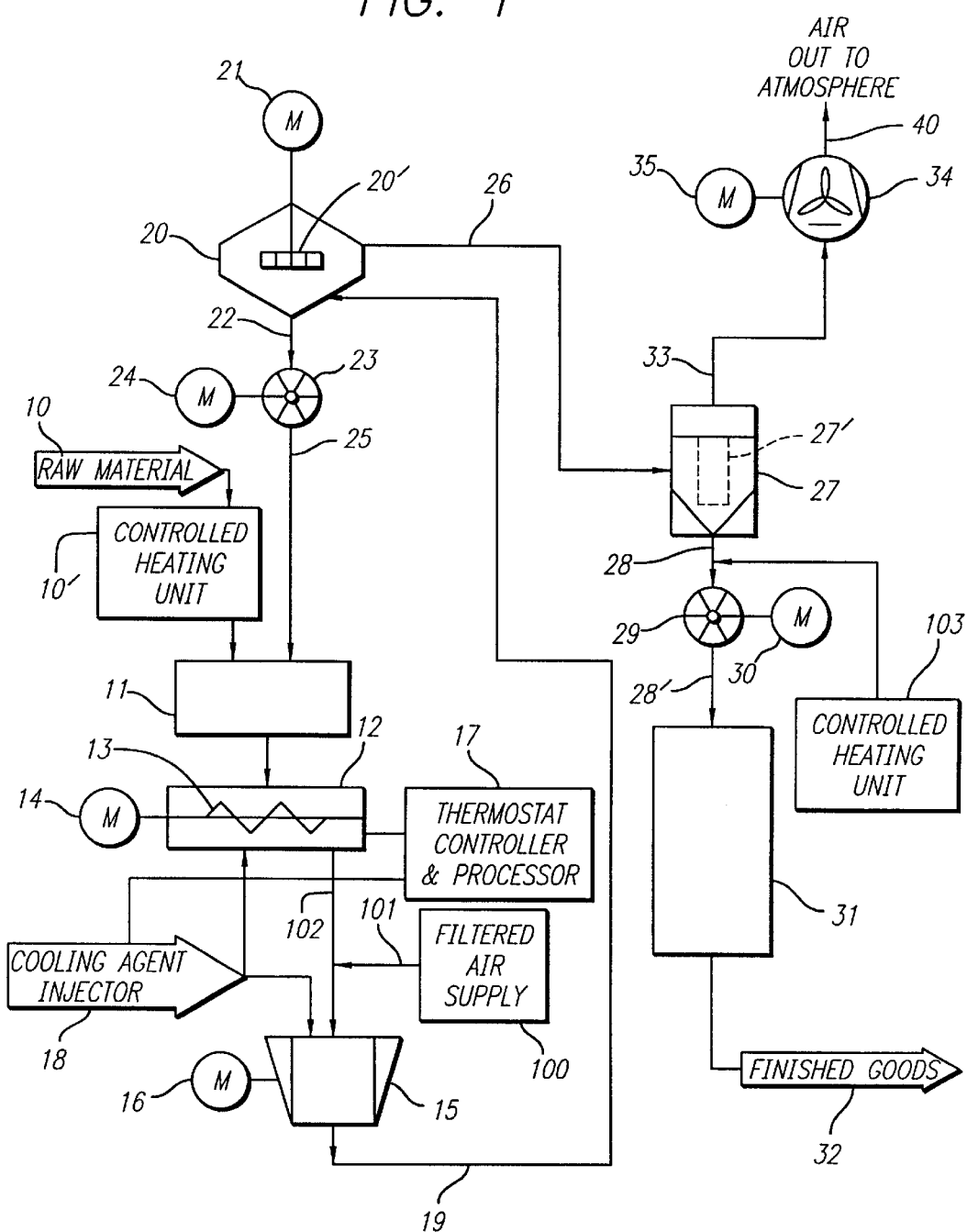

Referring now to the drawing, one preferred method for making the powder of the invention from soy beans, other legumes or grains will now be described with particular reference to soy beans for convenience of illustration. Raw dehulled soy beans (see arrow 10) pass through a conventional controlled heating unit 10' and from there are deposited into hopper 11. Unit 10' is optional and may be used to preshrink the raw soybeans which may be heated at about 300° F. for a predetermined short period of time. The raw soy beans have been previously cleaned, without using water and without drying the same, to remove rubbish, litter, foreign matter, etc.

From hopper 11, the raw soy beans are deposited by gravity and moved via screw conveyor 13, driven by motor 14, by gravity feed via air line 102 into a grinding mill 15. Mill 15 is activated by motor 16 and is a high speed impact crusher, such as a pin mill, air swept mill, etc. with or without an integrated sifter. The soy beans are ground to an average grain size of between about 5 to 25 microns, preferably about 15 microns.

In order to avoid a bleed-out of fatty ingredients and/or other constituted ingredients of the soy beans, the grinding or milling process is carried out under constant thermal and humidity conditions. This is accomplished by a conventional thermostat controller and processor 17 coupled to screw conveyor 13 which in turn is coupled to mill 15. Processor 17 also includes and operates a conventional cooling agent injector 18. Injector 18 is preferably coupled to screw conveyor 13 to inject a cooling agent therein but, optionally, may be also coupled to mill 15 to inject cooling agent thereon as indicated by the arrows shown. The temperature in the mill 15 is maintained between 0° C. and 50° C., preferably in the range of about 20° C. to 40° C. The injector 18 of processor 17 includes liquid nitrogen or other comparable cooling agents therein which may be used if necessary for cooling, and is controlled and monitored by the thermostat portion of processor 17. The humidity factor should preferably not exceed about 40 to 50%.

The movement of the materials in this process is carried out using air as a medium of transport. Thus, a conventional supply of filtered air (see box 100) is injected into line 102 as indicated by arrow 101. The ground soy beans are transported via an air line 19 to an air classifier 20 having a wind sifter 20' activated by motor 21. The sifter 20' is a dynamic-type of sifter and is operated at a slow speed. In the air classifier 20, the fine soy bean powder is separated into finished material and coarse material, as is well known in the art when using an air classifier. The coarse material is fed by gravity via air line 22 to a rotary valve air lock 23 operated by motor 24. This coarse material is fed by gravity via air line 25 back into hopper 11 and thus to mill 15. The finished material is fed via air line 26 into a filter and dust collector 27 having a filter 27' therein. Air used in the system moves via air line 33 to a fan 34 activated by motor 35 where it is vented to the atmosphere via line 40.

From filter and dust collector 27, the fine soy powder feeds by gravity via air line 28 through a rotary valve air lock 29 operated by motor 30 down line 28 to a storage tank 31.

The fine soy powder thus can be removed from tank 31 in any suitable manner to be used as desired (see arrow 32).

Due to the maintenance of the thermal and humidity conditions, via processor 17, the soy beans may be ground to a microfine grain size of between 5 to 25 microns, preferably about 15 microns, without any special pretreatment of the soy beans. Because of the grinding conditions, the ground soy bean powder maintains its original content of fatty ingredients and/or constituent ingredients.

A chemical analysis of the fine soybean powder in storage tank 31 was made by an independent laboratory that tested 3 other materials at the same time. Table 1 thus shows 4 tested samples, samples A, B & D being soybean powders sold by third parties. Sample C is applicant's product disposed in storage tank 31. In the following table, the percentage are by weight per 100 grams of material. NSI represents Nitrogen Solubility Index and PDI represents Protein Dispersibility Index.

| Sample No. | Test Material | Moisture | Fat | Protein | Fiber | Ash | NSI | PDI |
|---|---|---|---|---|---|---|---|---|
| A | Low Fat Soy Flour | 5.11% | 7.52% | 50.73% | 2.70% | 5.50% | 26.30% | 25.20% |
| B | Soy Milk Spray Dried | 3.26% | 25.16% | 46.42% | 0.70% | 4.80% | 42.20% | 89.30% |
| C | Soy Powder | 5.78% | 19.78% | 44.47% | 1.90% | 5.00% | 93.00% | 93.70% |
| D | Full Fat Soy Flour Enzyme Active | 9.32% | 15.78% | 38.47% | 4.30% | 4.505 | 53.30% | 89.20% |

It can be seen that applicant's process results in a soy powder having a PDI value about 5% higher than the standard spray dried soy powder tested. Applicant's powder has an NSI value of about 51% higher than standard spray dried soy powder. Spray dried soymilk powder is a high value product.

Nitrogen Solubility Index (NSI) is an indicator of the non-denatured value of the protein. The higher the NSI, the higher the solubility of the protein. This has a direct effect on applications such as soymilk and tofu manufacturing by increasing the yield of the final products. A similar effect is realized with other legumes and grains.

Protein Dispersability Index (PDI) is an indicator of how well an ingredient disperses/mixes when added to a liquid and is not dependent on the NSI. The better an ingredient disperses, the easier to use in a manufacturing environment.

It can be seen that the process disclosed herein results in particle size reduction having functionality of the proteins, carbohydrates and fats therein. The benefits are that these products do not have to be conventionally spray dried (the process of taking a liquid, running it through centrifuges to remove fiber and other unsoluble fractions and condensing) for final conversion into an improved spray dried powder; that is, the unexpected improvement in the functional and behavioral characteristics of soybean (and modified soybean ingredients) as well as other legumes, cereals and grains enables a more thorough use of whole and complete soybeans, legumes, cereals and grains where a complete fiber is desired. Reducing the particle size to a range of 5 microns to 25 microns eliminates undesirable mouthfeel and a grainy or sandy sensation on the tongue, as perceived by humans. Additionally, a larger surface area is achieved by the reduction of particle size. This results in an improvement in functionality of the proteins, starches, carbohydrates and fats, when compared to larger particle sizes of the aforementioned materials. In the aforementioned process of spray drying, there is a considerable loss of fiber and other nutritional constituents through the process of centrifuging. The process of centrifugation results in a high proportion of discardable material that poses a major waste disposal problem. In addition, a higher amount of waste water results from the typical spray drying process. This places a high biological oxygen demand ("BOD") on the municipal water system. An additional advantage is a much improved microbiological profile of the soy powder material. Specifically, the improved microbiological reduction applies to measurements of Standard Plate Count, Yeast and Mold.

Improved solubility and/or dispersability is also an added feature. Applicant's testing procedures shows that the same benefits are realized with all legumes, cereals, and grains and their constituents.

The following soybeans work in applicant's process disclosed herein:

Whole cleaned soybeans (@ protein 43%, @ fat 21%).

Dehulled whole soybeans (@ protein 45%, fat 22%).

Partially defatted soybean grit/coarse flour (@ protein 685, fat 0.05%).

Soybean concentrate (@ protein 68%, fat 0.05%).

Isolated soy protein (@ protein 85%, fat 0.05%).

Defatted soybean flake (white flake) @ (protein 68%, fat 0.05%).

After the powder moves from air lock 29, it may optionally be heated via unit 103 coupled by air line 103' to line 28 particularly if an enzyme inactive final product is desired. The residence time and temperature is controlled by a thermostat unit in unit 103.

Some of the qualities of the final product are that it is less expensive to make than other similar powders, particularly soy bean powders, has good digestibility when used to make other products using the powder, such as soymilk, tofu and dairy type analogs such as cheese, sour cream, cream cheese, yogurt, kefir, puddings, etc. The powder has improved functionality and is free from bitter compounds, has no residual solvent or processing aids and experiences no loss of quality.

As hereintofore indicated, although the grinding of raw soy beans has been discussed, any suitable grain or legume, such as rice, corn, pinto beans, wheat, etc. may be ground in like manner. Although a particular embodiment of the invention is disclosed, variations thereof may occur to an artisan and the scope of the invention should only be limited by the scope of the appended claims.

It is claimed:

1. A method of producing a fine powder from soy beans comprising the steps of:

feeding said soy beans into a mill; and grinding said soy beans into a fine grain in a single step while maintaining the thermal and humidity conditions inside said mill at a constant temperature between 0° C. to 50° C. in order to avoid a bleed-out of the fatty ingredients and to preserve the nutritional and functional aspects of said soy beans.

2. The method of claim 1 wherein the step of grinding includes grinding said soy beans to an average size of about 5 to 25 microns.

3. The method of claim 2 wherein the step of grinding includes the step of grinding to a particle size of about 15 microns.

4. The method of claim 1 wherein the step of maintaining the thermal and humidity conditions inside said mill at a constant temperature includes the step of maintaining the thermal and humidity conditions at a constant temperature of between about 20° C. to 40° C.

5. The method of claim 1 wherein the method of grinding includes the step of grinding soy beans to a fine powder having approximately the following characteristics wherein the percentage is by weight per 100 grams:

| | |
|---|---|
| Moisture | 5.78% |
| Fat | 19.78% |
| Protein | 44.47% |
| Fiber | 1.9% |
| Ash | 5.0% |
| Nitrogen Solubility Index | 93.0% |
| Protein Dispersibility Index | 93.7%. |

6. The method of claim 1 including adding heat to the ground material after the step of grinding.

7. The method of claim 6 wherein the step of adding heat includes adding heat at a temperature of about 200° F.–350° F.

8. The method of claim 1 including the step of preheating said soy beans prior to feeding the same into a mill.

9. A method of producing a fine powder from a grain or legume comprising the steps of:

feeding unwashed raw grain or legumes into a mill;

grinding said raw grain or legumes into a fine grain in a single step while maintaining the thermal and humidity conditions inside said mill at a constant temperature less than 50° C. in order to avoid a bleed-out of the fatty ingredients and to preserve the nutritional and functional aspects of said grain or legume.

10. The method of claim 9 wherein the step of grinding includes grinding said grain or legumes to an average particle size of about 5 to 25 microns.

11. The method of claim 10 wherein the step of grinding includes the step of grinding to a particle size of about 15 microns.

12. The method of claim 9 wherein said grain or legumes are ground to an average particle size of about 5–25 microns in a single grinding step.

13. The method of claim 9 wherein the step of maintaining the thermal and humidity conditions inside said mill at a constant temperature includes the step of maintaining the thermal and humidity conditions at a constant temperature of between about 20° C. to 40° C.

14. The method of claim 9 wherein the step of feeding a raw grain or legume includes feeding soy beans.

15. The method of claim 9 wherein the method of grinding includes the step of grinding soy beans to a fine powder having approximately the following characteristics wherein the percentage is by weight per 100 grams:

| | |
|---|---|
| Moisture | 5.78% |
| Fat | 19.78% |
| Protein | 44.47% |
| Fiber | 1.9% |
| Ash | 5.0% |
| Nitrogen Solubility Index | 93.0% |
| Protein Dispersibility Index | 93.7%. |

\* \* \* \* \*